Nov. 3, 1970  W. L. WEEKS ET AL  3,538,436
DEVICE FOR DETERMINING THE ENERGIZATION STATE OF THE CENTER
CONDUCTOR OF A SHIELDED CABLE BY SENSING A VOLTAGE DROP
IN THE SEMICONDUCTOR SHEATH OF THE CABLE
Filed June 12, 1967  6 Sheets-Sheet 1

INVENTOR.
WALTER L. WEEKS
JOHN I. SMITH
LAURENCE L. SHEETS
BENTON J. McCLURE

BY

ATTORNEY

Nov. 3, 1970  W. L. WEEKS ET AL  3,538,436
DEVICE FOR DETERMINING THE ENERGIZATION STATE OF THE CENTER
CONDUCTOR OF A SHIELDED CABLE BY SENSING A VOLTAGE DROP
IN THE SEMICONDUCTOR SHEATH OF THE CABLE
Filed June 12, 1967  6 Sheets-Sheet 2

INVENTOR.
WALTER L. WEEKS
JOHN I. SMITH
BY LAURENCE L. SHEETS
BENTON J. McCLURE

ATTORNEY

Nov. 3, 1970   W. L. WEEKS ET AL   3,538,436
DEVICE FOR DETERMINING THE ENERGIZATION STATE OF THE CENTER
CONDUCTOR OF A SHIELDED CABLE BY SENSING A VOLTAGE DROP
IN THE SEMICONDUCTOR SHEATH OF THE CABLE
Filed June 12, 1967   6 Sheets-Sheet 3

INVENTOR.
WALTER L. WEEKS
JOHN I. SMITH
LAURENCE L. SHEETS
BENTON J. McCLURE

BY  *J. R. Nesbitt*
ATTORNEY

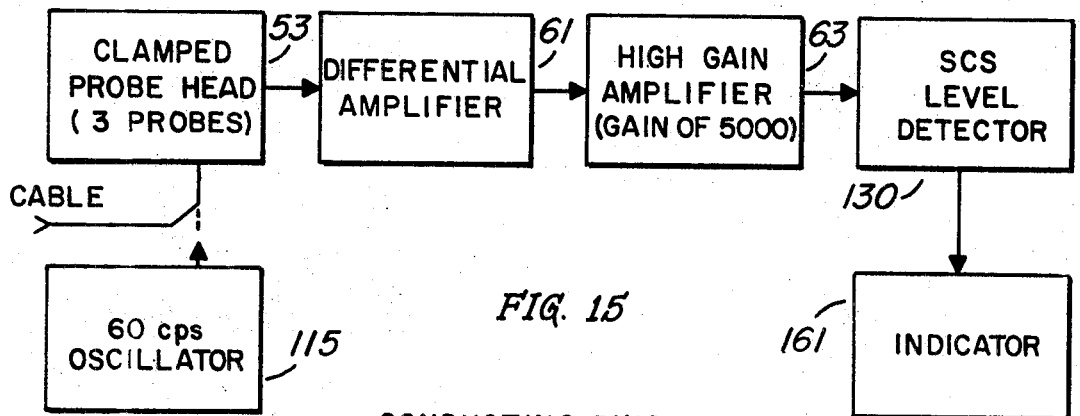
FIG. 15
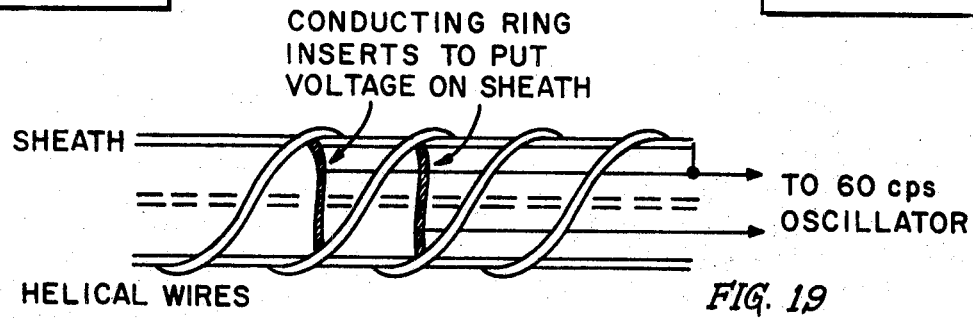
FIG. 19
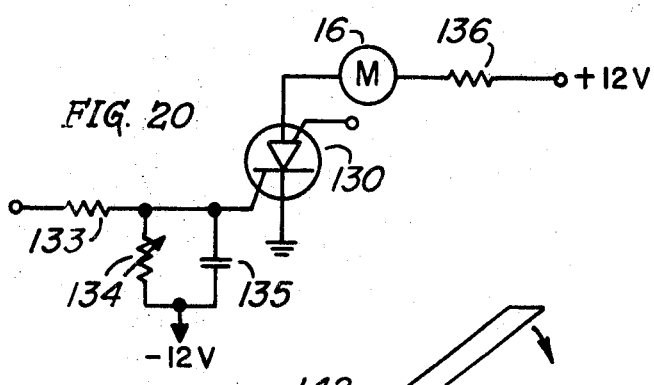
FIG. 20
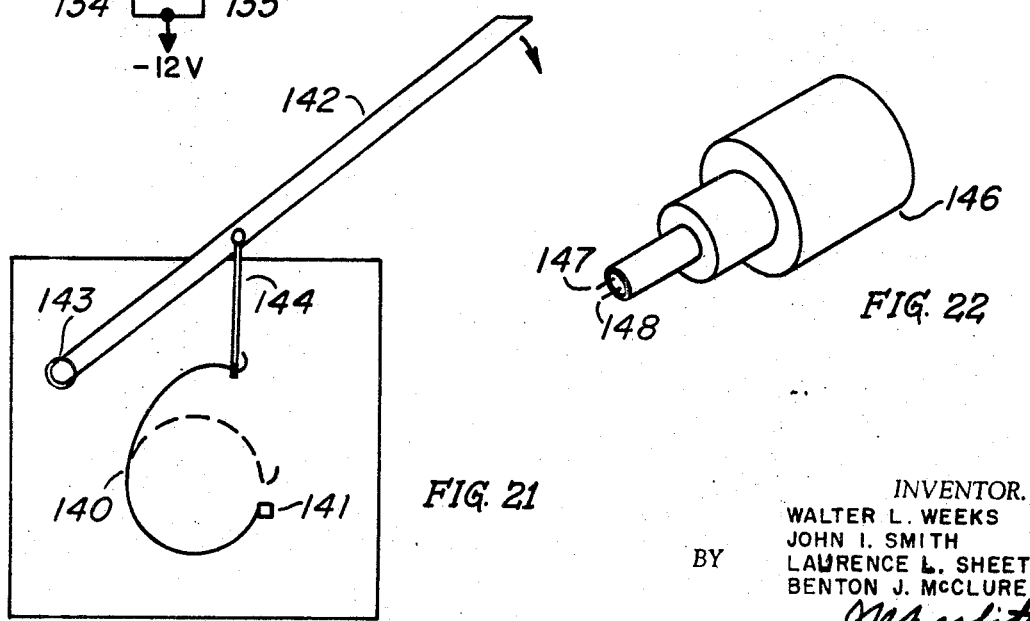
FIG. 21
FIG. 22
INVENTOR.
WALTER L. WEEKS
JOHN I. SMITH
LAURENCE L. SHEETS
BENTON J. McCLURE
BY
ATTORNEY United States Patent Office 3,538,436
Patented Nov. 3, 1970

3,538,436
DEVICE FOR DETERMINING THE ENERGIZATION STATE OF THE CENTER CONDUCTOR OF A SHIELDED CABLE BY SENSING A VOLTAGE DROP IN THE SEMICONDUCTOR SHEATH OF THE CABLE
Walter L. Weeks, West Lafayette, Ind., John I. Smith, Morristown, N.J., Laurence L. Sheets, Salem, N.H., and Benton J. McClure, West Lafayette, Ind., assignors to Purdue Research Foundation
Filed June 12, 1967, Ser. No. 645,349
Int. Cl. G01r 31/02
U.S. Cl. 324—72.5    4 Claims

ABSTRACT OF THE DISCLOSURE

A device and process for determining whether a shielded cable contains an energized conductor. The device senses a voltage drop in the semiconducting sheath of the shielded cable to positively indicate energization of the center conductor.

---

This invention relates to a device and process for sensing shielded cable energization and more particularly relates to a device and process for determining whether an underground shielded cable is energized.

It is oftentimes necessary to determine the energization state (i.e., either energized or de-energized) of the center conductor of a shielded cable. Such is the case, for example, where it is necessary to repair or otherwise work on an electric utility cable and it therefore becomes necessary for the workman to know whether the conductor is energized before he comes into contact therewith. This is less of a problem where the cable is readily accessible and switches are easily traceable, but with increased use of concealed cabling, such as underground, the problem is more acute.

While it might be possible to penetrate the shield of such a cable in some instances and make direct contact with the conductor, this can be dangerous and is contrary to existing safety regulations. In addition, it is not economically feasible to probide switches to positively assure an open circuit in all instances, especially where underground cable is involved.

In view of this, it is obviously desirable for a workman to have a device with which he can positively ascertain the energization state of a conductor without directly contacting the same. It is a feature of this invention to provide such a device as well as a process for making a positive determination of the energization state of a shilded cable. Basically this is accomplished by measuring a small voltage drop in the semiconducting sheath of the cable when the center conductor is energized.

It is therefore an object of this invention to provide a novel device for determining whether the conductor of a shielded cable is energized.

It is another object of this invention to provide a novel device capable of sensing a voltage drop in the semiconducting sheath of a shielded cable and determining therefrom whether the conductor is energized.

It is still another object of this invention to provide a novel shielded cable energization determining device having means for precluding erroneous de-energization indications.

It is yet another object of this invention to provide a novel device capable of distinguishing between energization of the neutral wires outside the semiconducting sheath and energization of the center conductor.

It is still another object of this invention to provide a novel method for determining whether the conductor of a shielded cable is energized.

With these and other objects in view which will become apparent to one skilled in the art as the description proceeds, this invention resides in a novel construction, combination and arrangement of parts substantially as hereinafter described and more particularly defined by the appended claims, it being understood that such changes in the precise embodiments of the herein disclosed invention may be included as come within the scope of the claims.

The accompanying drawings illustrate two examples of the embodiment of the invention, together with alternate component variations, constructed according to the best mode so far devised for the practical application of the principles thereof, and in which:

FIG. 15 is a block diagram of the preferred embodiment of the complete energization determining device of this invention;

FIG. 19 is a suggested cable mockup for the check provided for the oscillator shown in FIG. 16;

FIG. 20 is a schematic diagram of the silicon controlled switch shown in the block diagram of FIG. 15;

FIG. 21 is an alternate embodiment of a size adjustable clamp usable with a probe head; and FIG. 22 is an alternate embodiment of a probe head without a clamp and utilizing two probes.

Figure 1:
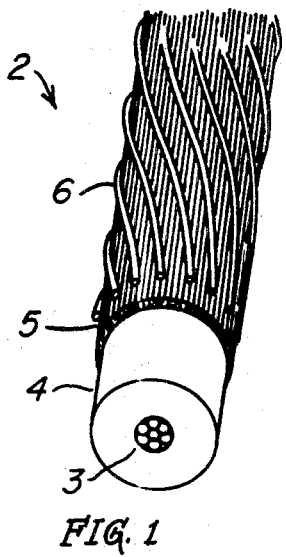
FIG. 1 is a cutaway perspective view of a length of shielded cable illustrating the parts thereof.

Referring now to the drawings in which like numerals have been used for like characters, the numeral 2 refers generally to the shielded cable, shown in FIG. 1, which cable includes a center conductor 3, a polyethylene insulator 4, a semiconducting sheath 5, and helical neutral wires 6.

When the center conductor 3 of cable 2 is energized there is a small displacement current caused by the energizing voltage (3 phase) which results in the small conductive voltage drop in the semiconducting sheath. This voltage drop is measured by the energization determining device of this invention, which device is able to respond to a conductor energization of a few hundred volts.

Figure 3:
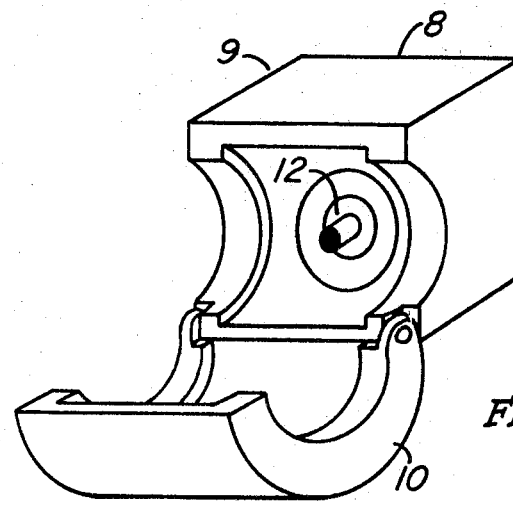
FIG. 3 is a perspective view of the probe head of the energization determining device shown in FIG. 2 with the head in an open position.
Figure 2:
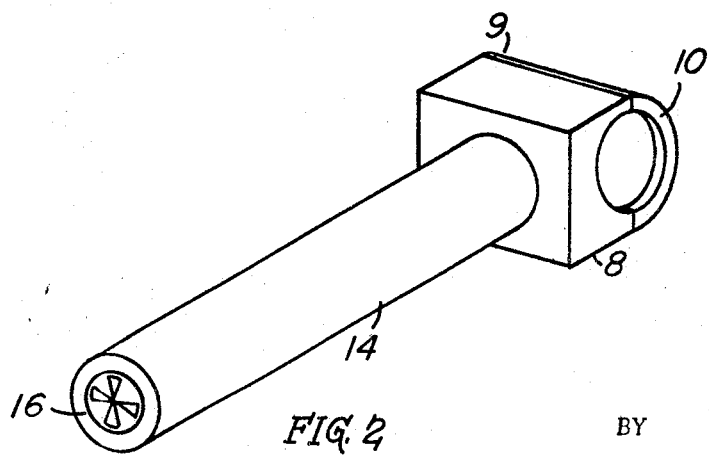
FIG. 2 is a perspective view of one embodiment of the energization determining device of this invention.

As shown in FIGS. 2 and 3, this device has a probe head 8 which includes a pair of split brass clamping blocks 9 and 10 which clamp tightly around the cable. Probe, or contact, 12 extends inwardly from block 9 toward the cable and is preferably spring-loaded. The probe head is designed to fit tightly about a portion of the conducting sheath from which the helical neutral wires 6 have been removed, the probe head, however, being grounded to neutral wires 6. As shown in FIG. 2, probe head 8 is attached to a hollow tube 14 which provides a housing for a transistor amplifier circuit 15 (FIG. 4) and an indicator 16. Indicator 16 preferably provides an absolute indication either that the cable is energized or de-energized. Tube 14 may be, for example, 1¾" in diameter and 12 inches in length.

Figure 4:
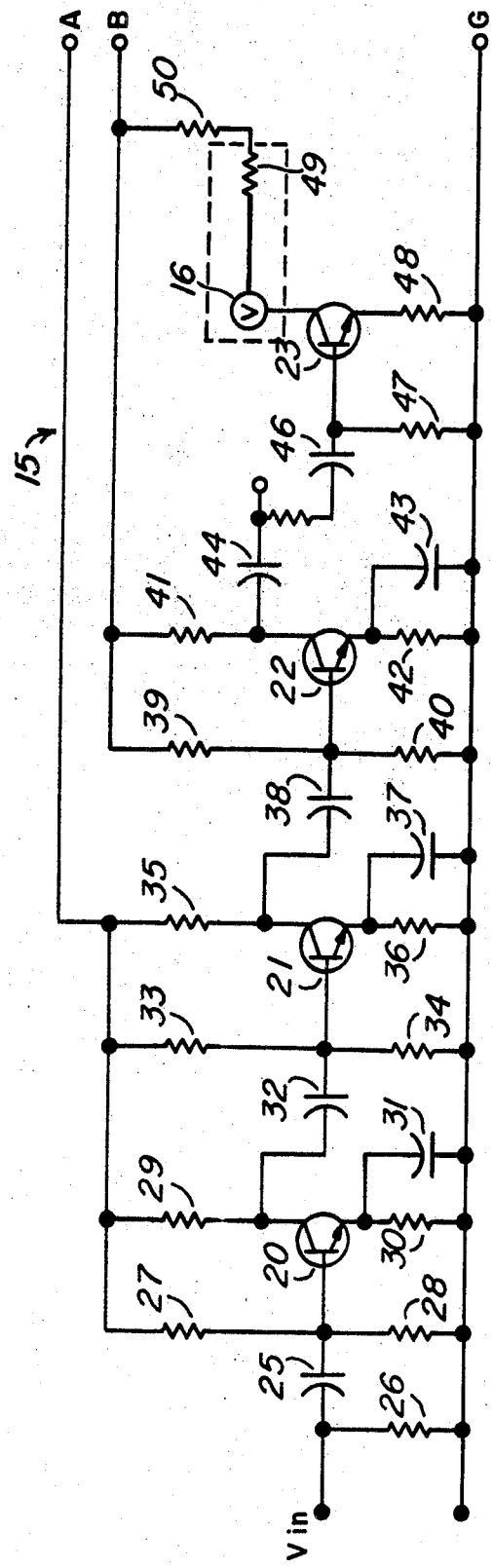
FIG. 4 is a schematic diagram of the energization determining device shown in FIG. 2.

Amplifier circuit 15 is preferably a low noise amplifier, and, as shown in FIG. 4, may include, for example, four transistors 20, 21, 22 and 23. As shown the voltage sensed at probe 12 is coupled to the base of transistor 20. The collectors of transistors 20 21 and 22 are connected to the base of transistors 21, 22 and 23, respectively, and the collector of transistor 23 is connected to inductor 16.

The particular components illustrated in FIG. 4, the invention not being meant to be limited thereto, are as follows: transistors 20–23—2N2484; capacitor 25—25 mfd.; resistor 26—1.2K; resistor 27—180K; resistor 28—30K; resistor 29—39K; resistor 30—10K; capacitor 31—300 mfd.; capacitor 32—10 mfd.; resistor 33—180K; resistor 34—33K; resistor 35—33K; resistor 36—8.2K; capacitor 37—300 mfd.; capacitor 38—10 mfd.; resistor 39—180K; resistor 40—33K; resistor 41—1.8K; resistor 42—470; capacitor 43—300 mfd.; capacitor 44—10 mfd.; capacitor 46—10 mfd.; resistor 47—5K; resistor 48—220; resistor 49—400; resistor 50—300.

Utilizing the device of FIG. 2, it has been demonstrated that the voltage drop in a semiconducting sheath can be measured where the conductor is energized with a least about 500 volts (the conductor is commonly energized in power company lines with a high voltage at low amperage, the voltage being usually between 440 volts and 15K volts). It has been found also that the voltage drop per centimeter along the surface of the sheath is of the order of two millivolts per kilovolt of primary excitation voltage in the center conductor.

As can be seen from the foregoing, the probe shown in FIG. 2 is effective in those situations wherein the helical neutral wires are cut or pulled away from the semiconducting sheath. If this is not the case, then the form of the invention shown in block form in FIG. 15 should be utilized since the form of the invention is well suited for use where the helical neutral wires have not been removed and is capable of distinguishing between sheath voltage drop due to the current in the conductor as opposed to a voltage drop due to current in the helical neutral wires.

On of the main difficulties associated with identifying the energized state of the center conductor by measurement of the sheath voltage drop arises from the "noise" or contaminating voltage caused by currents in the helical neutral wires. The relative magnitude of this noise voltage is variable since it depends on the several electrical contacts in the system; the order of magnitude of the "noise" voltage drop has been found to be about 200 microvolts/cm. per ampere of unbalanced current fed into the helical neutral wires. This means that with about 10 amperes of helical neutral current the noise voltages are as large or larger than the voltage arising from the lower levels of primary excitation. For this reason, the preferred embodiment of this invention utilizes a probe head having three probes and a differential amplifier.

Figure 5:
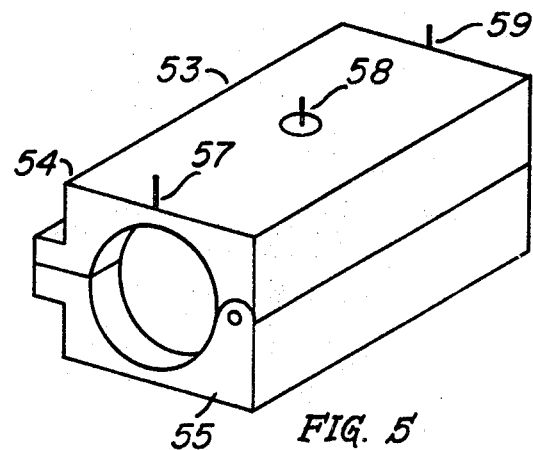
FIG. 5 is a perspective view of the preferred embodiment of the probe head of the energization determining device of this invention.

As shown in FIG. 5, probe head 53 has a pair of clamping blocks 54 and 55, with block 54 having three probles 57, 58 and 59. The sensed voltages at these three probes are coupled to a differential amplifier 61.

Figure 7:
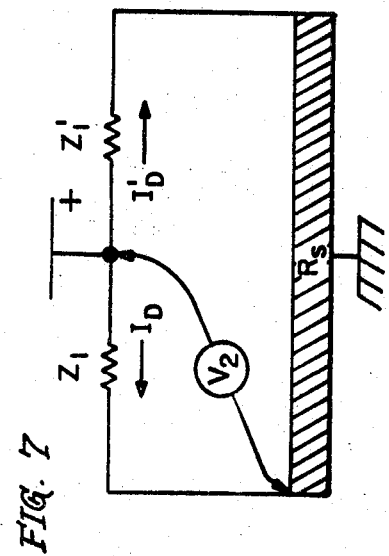

With the helical neutral wires in place, if the ground side of a probe head (probe blocks) form a uniformly good contact with the sheath, a line on the surface of the sheath parallel to the helical neutral wires and halfway between should be at the same potential with respect to either of the helical neutral wires. The sheath current will then be directed ayay from the center line of both sides of it. This fact is indicated in FIG. 7. For clarity and simplification, this figure oversimplifies the problem by representing the two dimensional sheath current flow as a one dimensional flow through impedances $Z_1$ and $Z_1'$. $Z_1$ and $Z_1'$ represent the impedances between the probe tip on the sheath and ground. In the ideal case, these impedances are essentially equal. $R_s$ is the very small resistance associated with the brass block portion of the probe head in series with a short length of helical neutrals. $I_D$ and $I_D'$ respresent the current in the sheath caused by the primary energization (and ideally are equal). The simplest probe-amplifier system identifies a primary excitation by measuring a voltage $V_2 = I_D Z_1$.

Figure 8:
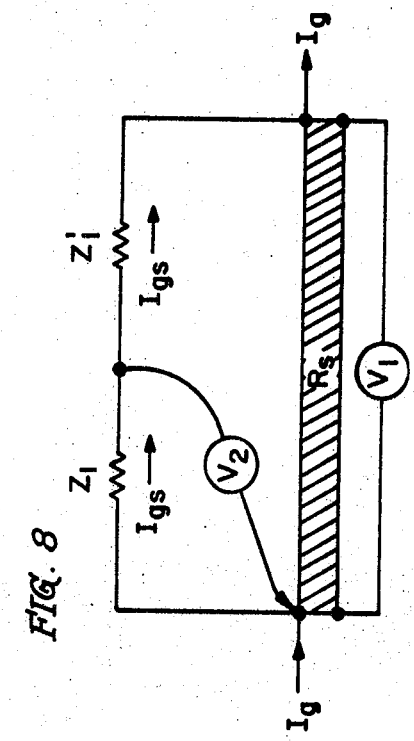
FIGS. 7 and 8 are simplified circuit representations of sheath current flow utilizing the probe head of FIG. 5 with FIG. 7 illustrating the condition of conductor energization and FIG. 8 illustrating the condition with helical neutral current flow.
Figure 10:
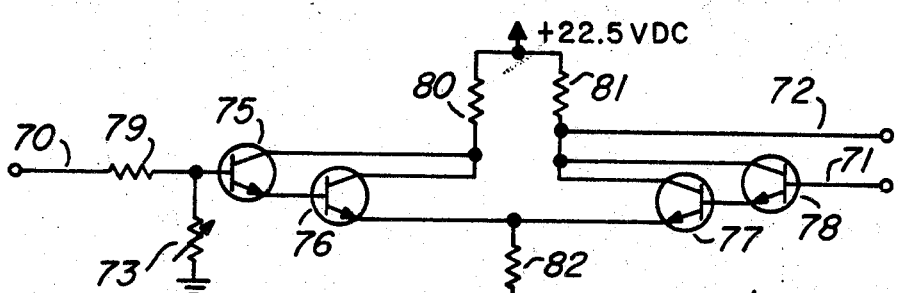
FIG. 10 is a schematic diagram of a "Darlington" differential amplifier which may be utilized in lieu of the amplifier shown in FIG. 9.

If the primary energization is off but there is a current $I_g$ in the helical neutral wires, a small portion, $I_{gs}$, of this will flow through the sheath, making a voltage across $Z_1$ which would appear as an erroneous indication of primary excitation on the indicator for voltage $V_2$ (FIG. 8). In the differential amplifier scheme of this invention, a simultaneous voltage measurement, $V_1$, is made of the voltage across $R_s$ (i.e., across $Z_1 + Z_1'$), along with the voltage $V_1$, across $Z_1$. In the circuit of FIG. 10, the voltage $V_1$ is applied between terminal 70 ($E_1$ in) and ground, while the voltage $V_2$ is applied between terminal 71 ($E_2$ in) and ground. The amplifier circuit is so arranged that the output signal $E_{out}$, taken at terminal 72, is given by $E_{out} = g(fV_1 - V_2)$ where $g$ is the gain of the differential amplifier and $f$ is a fraction (less than one) which is controllable by the setting of the variable resistor. Since hte voltage $V_1$ is always greater than $V_2$ in the absence of primary excitation (i.e., $I_D = 0$), the output $E_2$ may be adjusted to zero. Under ideal conditions, $V_2 = \frac{1}{2} V_1$, so $f$ would be ½ in order to cancel out the "noise" voltage.

Where primary excitation and helical neutral current exist simultaneously, by superposition $$V_2 = (I_{gs} - I_D) Z_1$$
$$V_1 = (I_{gs} - I_D) Z_1 + (I_{gs} + I_D') Z_1'$$

so $$fV_2 - V_2 = fI_{gs}(Z_1 + Z_1') - I_{gs} Z_1 - fI_D Z_1 + fI_D' Z_1' + I_D Z_1$$

Since funder normal conditions, $I_D Z_1 = I_D' Z_1'$, it follows that if $f$ is set equal to $Z_1 / (Z_1 + Z_1')$, the output voltage is $$E_{out} = g(fV_1 - V_2) = I_D Z_1$$

that is, the output voltage depends on the quantity $I_D Z_1$ in the same way as it does in the idealized case with no ground current. The actual value of $f$ can be set by the adjustment of a potentiometer 73 (FIG. 10) in the differential amplifier circuit. The clamping-probe device should be constructed so that $Z_1 = Z_1'$, in which case $f = \frac{1}{2}$.

In order for the differential amplifier scheme to give satisfactory results, the impedances $Z_1$ and $Z_1'$ should be nearly equal. In an actual cable, these values may be considerably different even if the sheath conductivity is accurately uniform since the values $Z_1$ and $Z_1'$ must include the effects of the contacts. While the contacts between the helical wires and probe clamp can be maintained easily, the contacts between the helical wires and sheath is more difficult.

Figure 9:
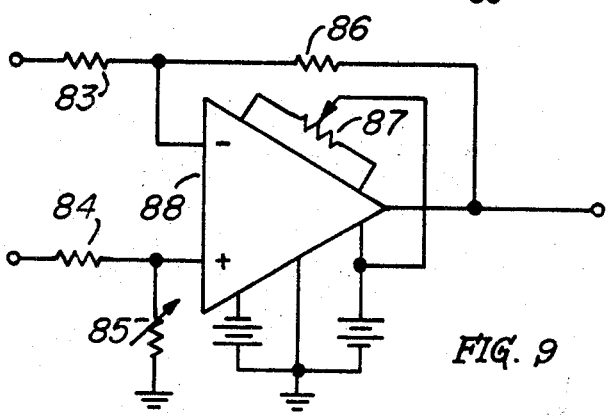
FIG. 9 is a partial schematic diagram of a "Nexus" differential amplifier which may be utilized as the differential amplifier shown in the block diagram of FIG. 6.

From the foregoing it can be clearly seen that the device of this invention enables the "noise" voltage in the neutral wires to be balanced out and an erroneous indication due to this voltage will be precluded to thus assure that an indication of energization of the conductor will be caused only when the sensed voltage drop is due to energization of the center conductor. Although a Darlington differential amplifier was described hereinabove, other types can also be used, such as, for example, the Nexus differential amplifier shown in FIG. 9. The particular values utilized in these amplifiers, the invention not being meant to be limited to the particular values, are as follows: resistor 73—0–10K; transistors 75–78—2N697; resistor 79—4.7K; resistor 80—120K; resistor 81—120K; resistor 92—120K; resistor 83—100; resistor 84—100; resistor 85—0–10K; resistor 86—10K; resistor 87—0–25K; Nexus operational amplifier —2LV-1. It was found that the differential amplifiers shown, along with a voltage amplifier 63 having a gain of 5000, can drive an indicator 16 of the type EMICO801, for example, while other types of standard indicators can be driven with one additional amplifier stage.

Figure 11:
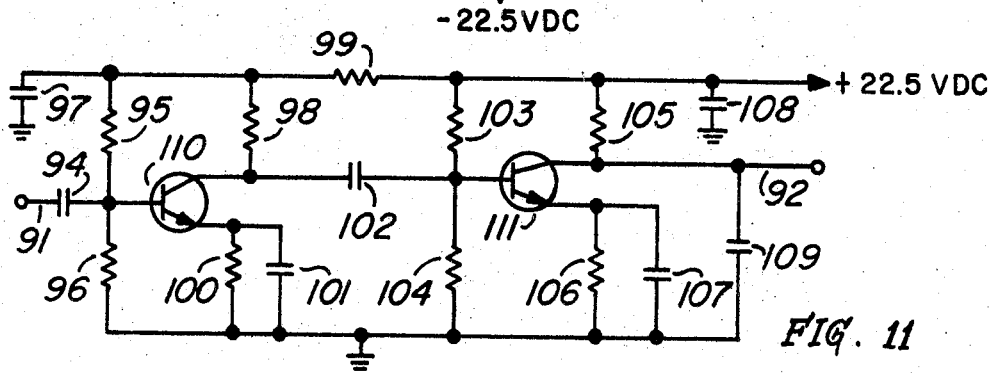
FIG. 11 is a schematic diagram of the voltage amplifier shown in the block diagram of FIG. 6.

An amplifier having a gain of 5000 is shown, by way of example, in FIG. 11, with the input at terminal 91 and the output at terminal 92. The particular component values, the invention not being meant to be limited thereto, are as follows: Capacitor 94—10 mfd.; resistor 95—180K; resistor 96—33K; capacitor 97—5 mfd.; resistor 98—33K; resistor 99—3.3K; resistor 100—8.2K; capacitor 101—10 mfd.; capacitor 102—10 mfd.; resistor 103—180K; resistor 104—33K; resistor 105—33K; resistor 106—8.2K; capacitor 107—10 mfd.; capacitor 108—100 mfd.; capacitor 109—0.1 mfd.; transistors 110–111—2N697.

Figure 6:
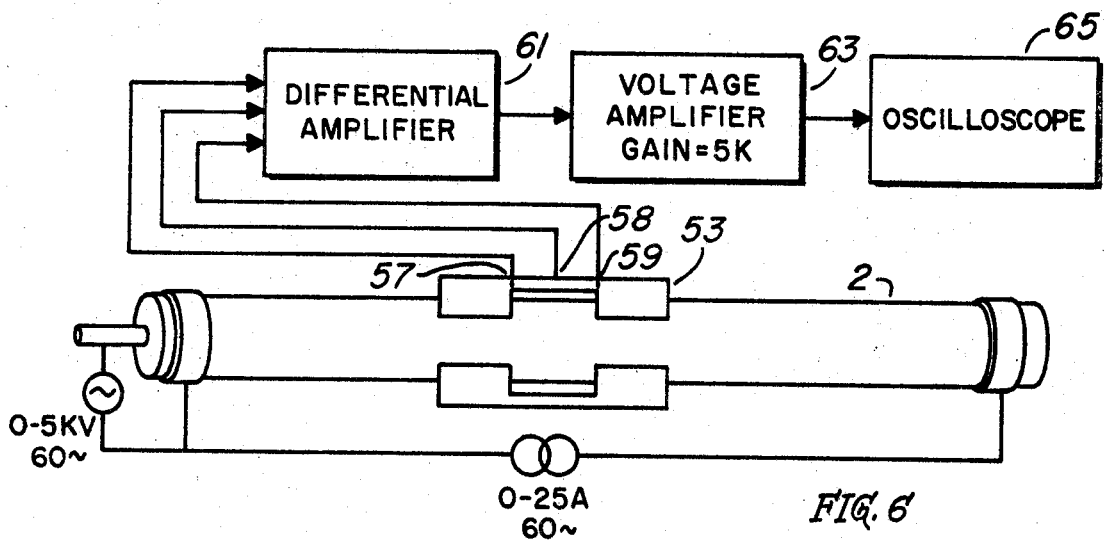
FIG. 6 is a partial block diagram illustrating the energization determining device of this invention utilizing the probe head shown in FIG. 5 and set up for experimental purposes.
Figure 12:
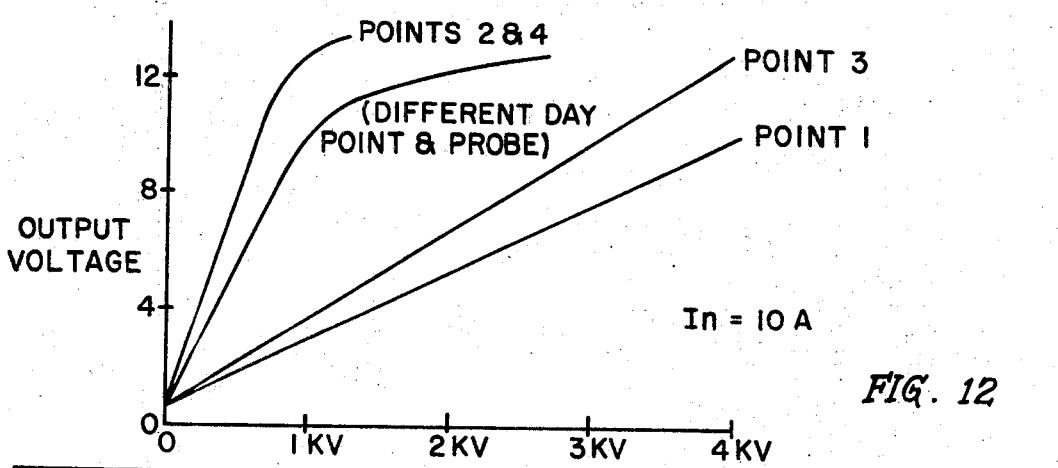
FIGS. 12 through 14 are graphs illustrating energization voltage versus output volts for the device shown in FIG. 6.
Figure 13:
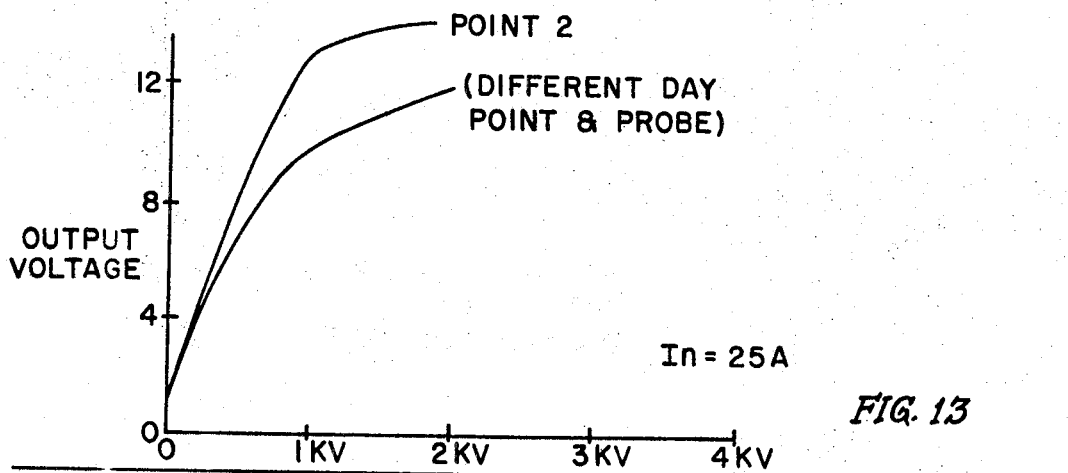
Figure 14:
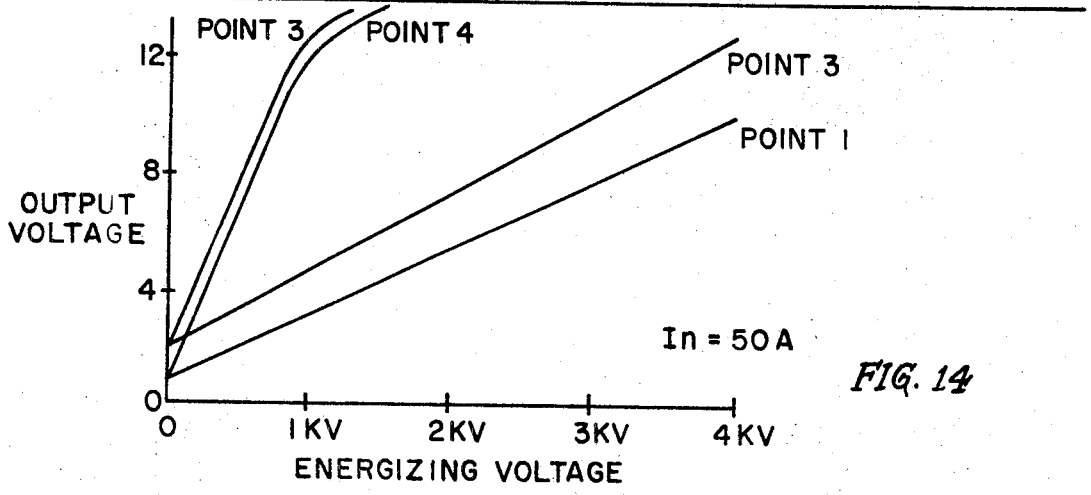

An experimental circuit for the differential amplifier evaluation is shown in FIG. 6 wherein the differential amplifier 61 is connected to receive the output from the three probes 57, 58 and 59. The output from differential amplifier 61 is then coupled through a voltage amplifier 63 having a gain of 5000 to an oscilloscope 65. Measurements were made at four spaced points on a nine (9) foot length of Kaiser 15 kv. #2 solid A1 underground cable and using a Nexus differential amplifier. The energizing voltage versus output volt graphs of FIGS. 12, 13 and 14 show the data for the four spaced points and serve to show that the differential amplifier does in fact provide a satisfactory device so long as some restrictions are imposed on the level of the helical neutral currents. With about 50 amperes of neutral current, reliable measurement of energizing voltage can be made provided the expected value of this voltage is greater than 1.5 kv. For example, a reliable measurement of an energizing voltage of 440 volts can be made providing the helical neutral currents are less than 10 amperes.

It is therefore obvious that the preferred embodiment of this invention utilizing a differential amplifier is suitable for most applications. If desired, a clamp ammeter (not shown) may be utlized to first check cable currents if there is any reason to believe that the helical neutral wires are carrying large currents. So long as the ammeter would indicate that less than a predetermined minimum (on the order of 3 amperes) is flowing in the cable, then the differential amplifier should reduce the level of the "noise" voltage due to the neutral currents to an acceptable fraction of the sheath voltages produced by kilovolt conductor energization levels.

Figure 16:
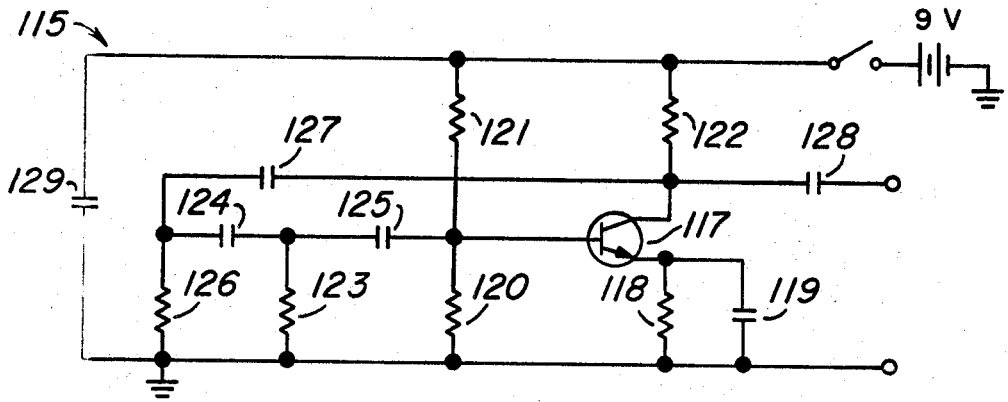
FIG. 16 is a schematic diagram of the oscillator shown in the block diagram of FIG. 15.

It has also been found preferable to check the operation of the device prior to actual testing of a cable to assure operational readiness since an erroneous indication of cable de-energization could be indicated if the device was not working. This check can be easily accomplished by including a 60 cycle oscillator 115 (as indicated in FIG. 15), which oscillator is connected to the clamp probe in order to simulate energization of the central conductor. Thus, if the device is operating properly, an indication of energization will be displayed at indicator 16. Oscillator 115, as shown in FIG. 16, may be a conventional phase shift oscillator operating with a 60 cycle output. Component values for the oscillator, the invention not being meant to be limited thereto, are as follows: resistor 118—1K; capacitor 119—100 mfd.; resistor 120—16K; resistor 121—47K; resistor 122—1.5K; resistor 123—1.5K; capacitor 124—0.39 mfd.; capacitor 125—0.39 mfd.; resistor 126—2.2K; capacitor 127—0.39 mfd.; capacitor 128—0.1 mfd.; capacitor 129—100 mfd.

Figure 17:
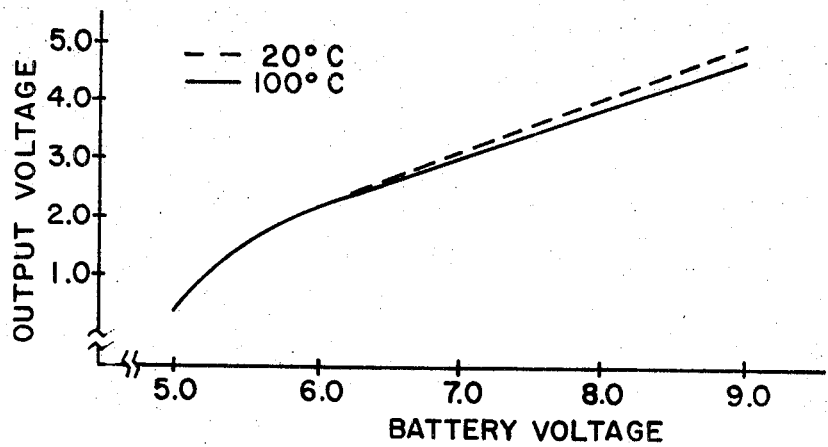
FIGS. 17 and 18 are graphs illustrating performance characteristics of the oscillator shown in FIG. 16.
Figure 18:
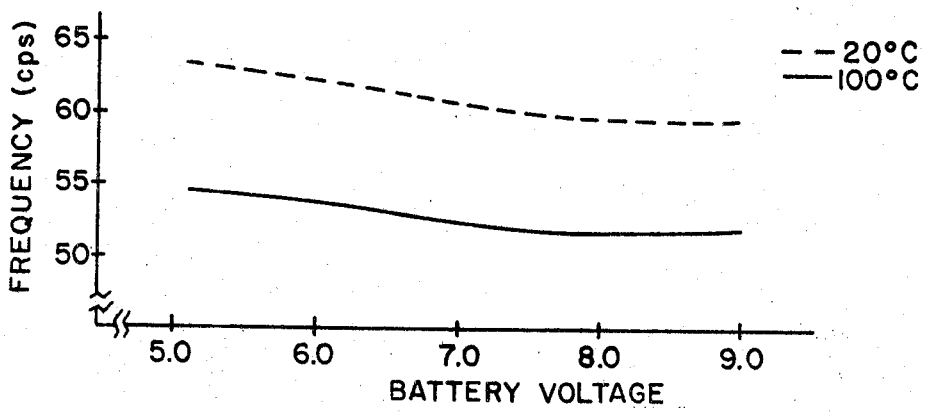

FIGS. 17 and 18 show the output voltage of the oscillator as a function of the battery voltage while FIG. 18 shows the frequency of the oscillator as a function of the battery voltage. A suggested cable mockup for the check of the device is shown in FIG. 19.

A block diagram of the preferred embodiment of the device of this invention is shown in FIGS. 15, as brought out hereinabove, and shows that the clamped probe output is coupled through differential amplifier 61 and second amplifier 63 to a silicon controlled switch level detector 130 for determining the threshold at which an output indication of cable energization is coupled to indicator 16.

Silicon controlled switch 130 includes, as shown in FIG. 20, resistors 133 (100K) and 134 (0–1M) which form a voltage divided by which the level of input necessary to fire the SCS can be set and also provide a high impedance load for amplifier 63. Capacitor 135 (0.0025 mfd.) attenuates frequencies above 600 c.p.s.. Indicator 16, which may be an EMICO801 meter, for example, is connected to the anode of the SCS in series with current limiting resistor 136 (2K). After the SCS fires, the output is maintained until the SCS is reset.

To accommodate cables of different sizes, an adjustable probe head such as indicated in FIG. 21 may be utilized, if desired. As shown, a strong flexible metal band 140 is secured at one end to post 141 and clamped about a cable by means of locking lever 142 pivoted about post 143 and having arm 141 connected to the free end of band 140. To provide for different size cable, bands of different sizes may, of course, be utilized.

With a small sacrifice of reliability, a balanced two pin probe without a clamp, as shown in FIG. 22, could be utilized in lieu of the probe shown in FIG. 2. As shown in FIG. 22, probe head 146 includes two outwardly extending probes 147 and 148 which are brought into contact with the semiconducting sheath to test for conductor energization. Such a probe is usable for testing cables from which the helical neutral wires have been removed at the point of the test, and utilizes the differential amplifier scheme as does the three probe device described hereinabove.

From the foregoing, it can be seen that with a few hundred volts of primary excitation in the center conductor of a shielded cable, the semiconducting sheath will have a voltage drop that can be detected by the device of this invention, the exact embodiment utilized depending on whether the helical neutral wires are removed from the cable. This invention thus provides a heretofore unknown device and method for determining the energization state of such a cable.

What is claimed as our invention is:

1. A device for determining the the energization state of the center conductor of a shielded cable having a semiconducting sheath with helical neutral wires wound thereabout without contacting said center conductor, said device comprising: sensing means having three spaced probes each of which is engageable with the shielded cable to be tested, one of which contacts the semiconductor sheath of the cable and the other two of which contact the helical neutral wire; differential amplifying means having three input terminals and one input terminal; said three probes being electrically connected to the three input terminals of said differential amplifier, and said differential amplifier including noise elimination means connected such that the potential drops between probes due to unbalanced neutral currents in the helical neutral wires and semiconducting sheath are opposed and thereby cancelled while the potential drop due to center cable energization is not cancelled and thereby produces an output indicative of a voltage drop in said semiconducting sheath sensed by said probes; and means connected with the output terminal of said differential amplifying means for indicating the energization state of a cable engaged by said probes.

2. The device of claim 1 wherein said last named means includes a high gain amplifier connected to receive the output from said differential amplifying means.

3. The device of claim 1 wherein said last named means includes a threshold detector for precluding an indication of cable energization unless the output from said differential amplifying means exceeds a predetermined value.

4. The device of claim 1 further characterized by an oscillator connected with said probes for testing said device prior to use to assure operability of said device to thereby preclude an erroneous indication due to device fault.

References Cited

UNITED STATES PATENTS

| | | | |
|---|---|---|---|
| 837,599 | 12/1906 | Williams. | |
| 1,745,419 | 2/1930 | Henneberger | 324—52 XR |
| 2,237,187 | 4/1941 | Mantilla. | |
| 2,471,560 | 5/1949 | Everson | 324—54 |
| 2,565,307 | 8/1951 | Harding | 324—52 |
| 3,396,231 | 8/1968 | Anderson | 324—54 XR |
| 2,423,447 | 7/1947 | Grimm | 324—95 |

RUDOLPH V. ROLINEC, Primary Examiner

R. J. CORCORAN, Assistant Examiner

U.S. Cl. X.R.

324—133